(12) United States Patent
Gaston et al.

(10) Patent No.: US 10,535,351 B2
(45) Date of Patent: Jan. 14, 2020

(54) AIRCRAFT AND INSTRUMENTATION SYSTEM FOR VOICE TRANSCRIPTION OF RADIO COMMUNICATIONS

(71) Applicant: Gulfstream Aerospace Corporation, Savannah, GA (US)

(72) Inventors: Randy Gaston, Savannah, GA (US); James Ward, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 485 days.

(21) Appl. No.: 14/837,511

(22) Filed: Aug. 27, 2015

(65) Prior Publication Data

US 2016/0063999 A1    Mar. 3, 2016

Related U.S. Application Data

(60) Provisional application No. 62/042,699, filed on Aug. 27, 2014.

(51) Int. Cl.
*G10L 15/26* (2006.01)
*G10L 25/48* (2013.01)
*G08G 5/00* (2006.01)

(52) U.S. Cl.
CPC ............ *G10L 15/26* (2013.01); *G08G 5/0013* (2013.01); *G08G 5/0021* (2013.01); *G10L 25/48* (2013.01)

(58) Field of Classification Search
None
See application file for complete search history.

(56) References Cited

U.S. PATENT DOCUMENTS

| | | | |
|---|---|---|---|
| 9,299,340 B2* | 3/2016 | Kar | G08G 5/0013 |
| 2008/0045198 A1 | 2/2008 | Bhogal et al. | |
| 2008/0065275 A1 | 3/2008 | Vizzini | |
| 2010/0027768 A1 | 2/2010 | Foskett | |
| 2011/0066362 A1* | 3/2011 | He | G08G 5/0008 |
| | | | 701/120 |
| 2011/0298648 A1* | 12/2011 | Ferro | G08G 5/0008 |
| | | | 342/29 |
| 2012/0179368 A1* | 7/2012 | Walter | G05D 1/101 |
| | | | 701/465 |

(Continued)

OTHER PUBLICATIONS

International Searching Authority of the Patent Cooperation Treaty, International Search Report and Written Opinion in International Application No. PCT/US2015/047217, dated Apr. 25, 2016.

(Continued)

*Primary Examiner* — Marcus T Riley
(74) *Attorney, Agent, or Firm* — LKGlobal | Lorenz & Kopf, LLP

(57) ABSTRACT

Aircraft instrumentation systems, aircraft, and controllers are provided for transcribing radio communications. An aircraft instrumentation system and an aircraft include a radio device, a display device, and a controller. The controller is communicatively coupled with the radio device and the display device. The controller is configured to monitor the radio device and recognize a voice communication received over the radio device. The controller is further configured to generate an electronic transcript of the voice communication and control the display device to display a transcript of the voice communication.

16 Claims, 2 Drawing Sheets

(56) References Cited

U.S. PATENT DOCUMENTS

| | | | |
|---|---|---|---|
| 2013/0093612 A1* | 4/2013 | Pschierer | G08G 5/0013 342/36 |
| 2013/0346081 A1 | 12/2013 | Loubiere et al. | |
| 2014/0122070 A1* | 5/2014 | Prus | G08G 5/0021 704/235 |
| 2015/0100311 A1* | 4/2015 | Kar | G08G 5/0013 704/231 |
| 2016/0063999 A1* | 3/2016 | Gaston | G10L 15/26 704/235 |

OTHER PUBLICATIONS

The International Bureau of WIPO, International Preliminary Report on Patentability for International Application No. PCT/US2015/047217 dated Mar. 9, 2017.

* cited by examiner

AIRCRAFT AND INSTRUMENTATION SYSTEM FOR VOICE TRANSCRIPTION OF RADIO COMMUNICATIONS

CROSS-REFERENCE TO RELATED APPLICATIONS

This application claims the benefit of U.S. Provisional Application No. 62/042,699, filed Aug. 27, 2014, and entire contents of which are incorporated herein by reference.

TECHNICAL FIELD

The technical field generally relates to aviation, and more particularly relates to aircraft, instrumentation, and controllers for voice transcription and identification of commonly communicated data in air traffic control communications.

BACKGROUND

Voice communications are a common and important aspect of aircraft flight operations. One important source of these voice communications is Air Traffic Control (ATC). ATC voice communications must be understood and read back to ATC. This understanding and reading back is especially important when ATC is changing the flight clearance. When flying into unfamiliar areas or certain congested areas, the clearance may not be readily understood. Additionally, the understanding and reading back places a burden on the memory of the flight crew.

Accordingly, it is desirable to provide systems and methods to assist the flight crew with these radio communications. Furthermore, other desirable features and characteristics of the present invention will become apparent from the subsequent detailed description of the invention and the appended claims, taken in conjunction with the accompanying drawings and this background of the invention.

BRIEF SUMMARY

Various non-limiting embodiments of aircraft instrumentation systems, aircraft, and controllers are disclosed herein.

In a first non-limiting embodiment, an aircraft instrumentation system includes, but is not limited to, a radio device, a display device, and a controller. The radio device is configured to receive voice communications during flight and the display device is configured to display information to a flight crew of the aircraft. The controller is communicatively coupled with the radio device and the display device. The controller is configured to monitor the radio device and recognize a voice communication received over the radio device. The controller is further configured to generate an electronic transcript of the voice communication and control the display device to display a transcript of the voice communication.

In a second non-limiting embodiment, an aircraft includes, but is not limited to, a radio device configured to receive voice communications, a display device, and a controller communicatively coupled with the radio device and the display device. The controller is configured to monitor the radio device and recognize a voice communication received over the radio device. The controller is further configured to generate an electronic transcript of the voice communication, to identify at least one of airways, waypoints, navigation aids, and airports within the voice communication, and to control the display device to display a transcript of the voice communication.

In a third non-limiting embodiment, a controller includes, but is not limited to, a processor and an electronic memory unit communicatively coupled with the processor. The electronic memory unit storing instructions that when executed by the processor cause the controller to monitor a voice communication from a radio device, to generate an electronic transcript of the voice communication, and to generate a signal that causes a display device to visually present the electronic transcript.

receive voice communications from a radio device, generate a transcription of the voice communications, and generate a signal that causes a display device to visually present the transcription.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Aircraft instrumentation systems, aircraft, and methods are provided for voice transcription of radio communications. Having an electronic text transcript of the voice communication allows a persistent reference to the information conveyed in the voice communication to assist the flight crew in performing as required.

Figure 1:
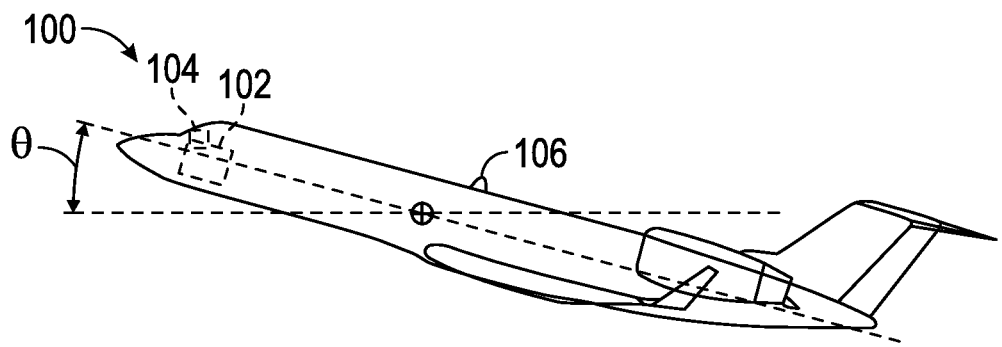
FIG. 1 is a simplified block diagram of a non-limiting embodiment of an airplane made in accordance the teachings of the present disclosure.
Figure 2:
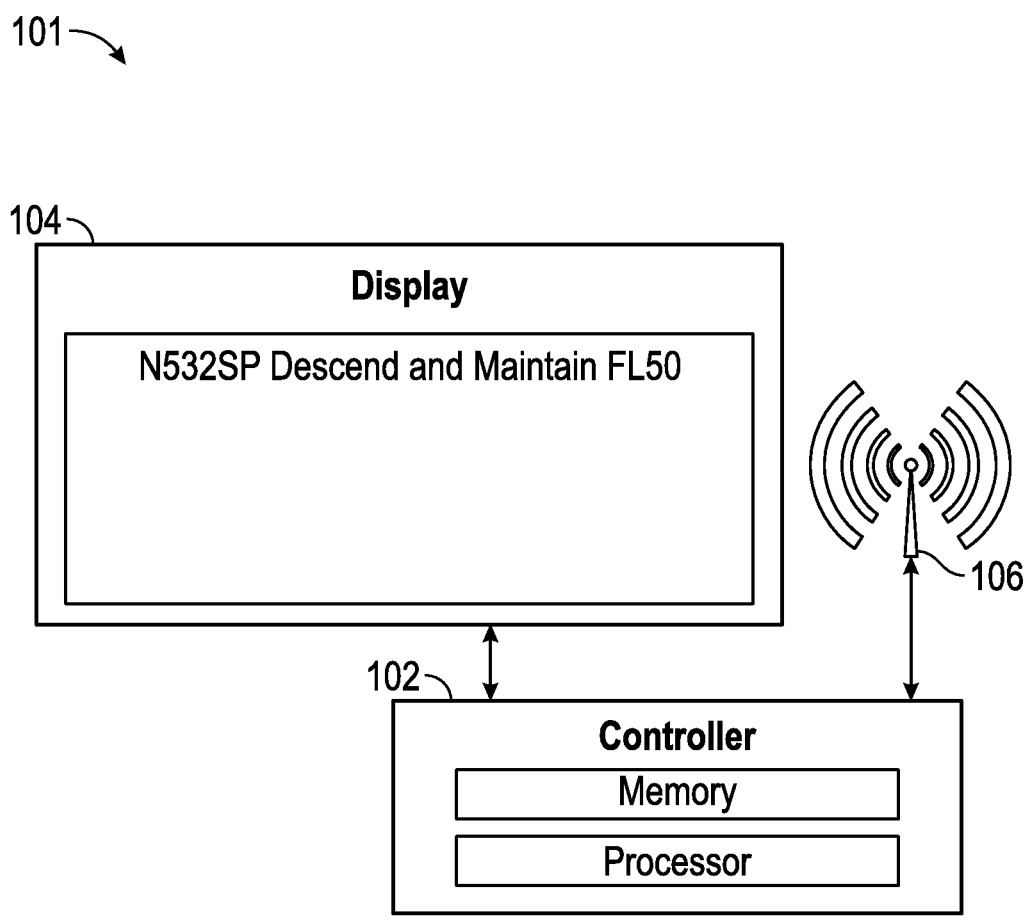
FIG. 2 is a simplified block diagram of a non-limiting embodiment of an aircraft instrumentation system made in accordance with the teachings of the present disclosure.

With reference to FIG. 1 and FIG. 2, an aircraft 100 and an aircraft instrumentation system 101 are illustrated in accordance with some embodiments. Aircraft 100 includes aircraft instrumentation system 101. Aircraft instrumentation system 101 includes a controller 102, a display device 104, and at least one radio device 106. Display device 104 may be a primary flight display (PFD), a multi-function display (MFD), or other display device configured to present information to a flight crew of aircraft 100. Radio device 106 may be an antenna or other component that is configured to receive voice communications from air traffic control (ATC) and/or other aircraft.

Controller 102 is communicatively coupled with display device 104 and radio device 106. Controller 102 may include multiple controllers or computers, or may be a standalone controller. Controller 102 may include hardware in any combination with software and firmware. For example, controller 102 may include an application specific integrated circuit (ASIC), an electronic circuit, a processor (shared, dedicated, or group) and electronic memory unit that execute one or more software or firmware programs, a combinational logic circuit, and/or other suitable components that provide the described functionality. In the example provided, controller 102 includes electronic memory unit and a processor.

Controller 102 is configured to generate an electronic transcript of the voice communications received by radio device 106. For example, controller 102 may include a speech recognition engine tied to the incoming communication receivers that convert speech to a text transcript in electronic format. This text is then available for manipulation or for display to the flight crew. In the example provided, the speech recognition engine considers and compensates for the alteration of speech quality due to the radio communication impacts to dynamic range and frequency content of the speech audio, as will be appreciated by those with ordinary skill in the art.

In some embodiments, controller 102 receives and transcribes voice communications from all active communication radios. In some embodiments, voice communications from only a portion of the active communication radios are transcribed. Controller 102 is further configured to display the electronic transcript on display device 104. For example, controller 102 may generate a video signal to be presented on display device 104.

Controller 102 is further configured to replace spoken word waypoints, spelled out phonetic alphabet waypoints, and combinations thereof in the voice communications with waypoint identifiers in the display. As will be appreciated by those with ordinary skill in the art, waypoints are sometimes spoken as words and sometimes spelled out using a standard phonetic alphabet. Word pronunciation of the same waypoint may vary between air traffic controllers and may not be the pronunciation expected by the pilot. Such replacement may be performed in the initial electronic transcript, in a modified transcript, during display of the electronic transcript, or by other suitable methods without departing from the scope of the present disclosure.

In some embodiments, controller 102 includes a dictionary that can be modified to provide the best matches for the waypoints. Controller 102 converts these spoken word and phonetic alphabet waypoints into three to five letter waypoint identifiers. In the example provided, controller 102 uses standard phraseology as listed in FAA Order 7110-65P as a basis for the language. In some embodiments, research or other sources may indicate different standards for non-FAA controllers.

In some embodiments, controller 102 is further configured to identify local variations in phonetic alphabets. For example, the taxiway marked "D" at Atlanta is called "Dixie" rather than "Delta" to avoid confusion with the predominant airline operator in Atlanta. Controller 102 is configured to recognize the deviation from standard phraseology during transcription. It should be appreciated that other local variations are recognized, as will be appreciated by those with ordinary skill in the art.

In some embodiments, controller 102 is further configured to filter the voice communications to remove non-standard phrases that carry no information content. For example, controller 102 may reject some specific non-standard phrases carrying no information content, such as "Good day" and "Thank you."

Controller 102 is further configured to accommodate non-standard phraseology and deviations from standard phraseology. For example, controller 102 may recognize "one four thousand", "one four, fourteen thousand", "fourteen thousand." In some embodiments, controller 102 standardizes such deviations into a user configurable format. For example, controller 102 may identify that "maintain 5000" in the voice communication is the same as "FL50," and may replace "5000" with "FL50" if the flight level format has been selected as the standardized format.

Controller 102 is further configured to identify a call sign based on an abbreviated call sign, a variation on the call sign, an end portion of the call sign, and combinations thereof. As will be appreciated by those with ordinary skill in the art, variations on call signs may be encountered in some voice communications. For example, initial contact is always supposed to use the full call sign (e.g., "November five three two sierra papa"). Controller 102 is configured to recognize variations on such full call signs to match communications with a particular call sign. For example, controller 102 may recognize "Gulfstream five three two sierra papa," "November five thirty-two sierra papa," "Gulfstream two sierra papa," or "Two Sugar Pop" as matches for "November five three two sierra papa." As will be appreciated by those with ordinary skill in the art, late microphone activation by the originator of the voice communications may cut off the front part of the call sign. Controller 102 is therefore configured to attempt to match these end portions of call signs to the full call sign that was previously communicated. Upon identification of the full call sign, controller 102 is configured to display the full call sign to the flight crew.

In some embodiments, controller 102 is further configured to identify at least one of airways, waypoints, navigation aids, and airports within the voice communications. In some embodiments, identification of the at least one of airways, waypoints, navigation aids, and airports within the voice communications is based on at least one of a flight plan and a current location of an aircraft in which the aircraft instrumentation system is located. For example, aircraft position and/or the intent of the FMS flight plan may be used to limit the search or to prioritize the results into the most likely correct identification of airways, waypoints, navigation aids, and airports. In some embodiments, the current location or intent of the FMS flight plan may be used to identify local variations in the phonetic alphabet.

In some embodiments, controller 102 is further configured to identify an intended recipient of the voice communications. For example, controller 102 may match the call sign identified in the voice communications with a call sign of aircraft 100. In some embodiments, controller 102 is further configured to display the electronic transcript on the display device based on the intended recipient of the voice communications. For example, controller 102 may match the aircraft call sign so that communications pertinent to the aircraft may be filtered or highlighted based on the aircraft call sign.

In some embodiments, controller 102 may be further configured to identify the originator of the voice communications and to display the electronic transcript on the display device based on the originator of the voice communication. For example, controller 102 may attempt to match the frequency and phonetics of a voice with a call sign associated with the voice to assist with identification of the originator.

In some embodiments, controller 102 is further configured to translate the voice communications into a predetermined language. For example, controller 102 may convert the text of the electronic transcript from the incoming language to a desired output language. Controller 102 may additionally identify the incoming language based on the aircraft position or intended FMS flight plan. By translating these foreign communications—which are often between other aircraft—to the native language of the flight crew, controller 102 may assist the flight crew with situational awareness communicated by the foreign communications.

As used herein, terms such as "filtering," "converting," "replacing," and "identifying" may be operations associated with the original electronic transcript, with modified copies of the electronic transcript, or with display of either type of transcript on the display device, as will be appreciated by those with ordinary skill in the art.

Figure 3:
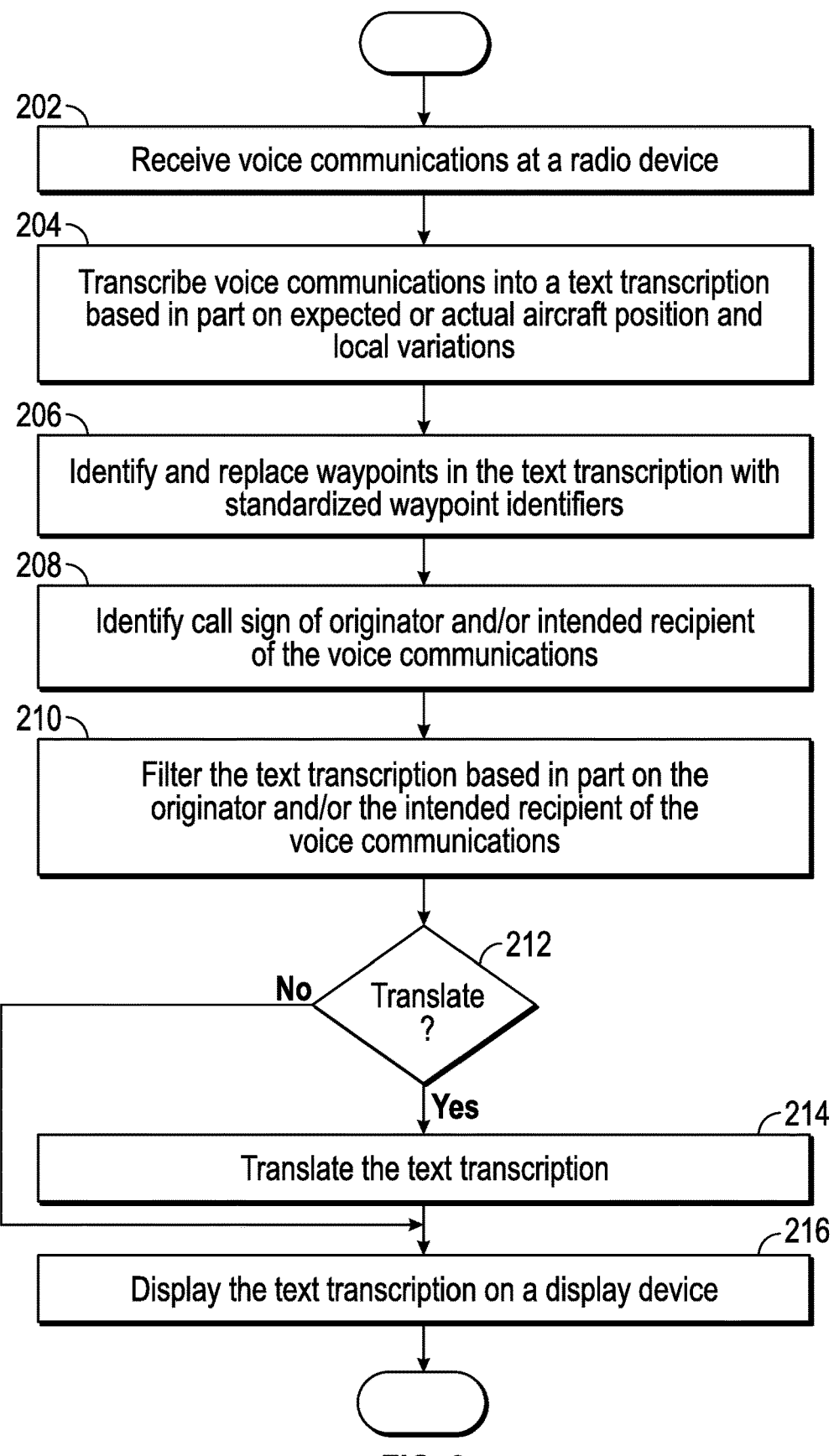
FIG. 3 is a simplified flow diagram of operations for a non-limiting example of a method in accordance with the teachings of the present disclosure.

Referring now to FIG. 3, a method 200 of voice transcription of voice communications in an aircraft is illustrated. In the example provided, various operations of method 200 are performed by components of aircraft 100, such as controller 102 of aircraft instrumentation system 101. For example, controller 102 may include instructions that, when executed on a processor, cause the controller to perform the operations of method 200.

Radio device 106 receives voice communications in operation 202. For example, voice communications may be received as electromagnetic waves at specified frequencies corresponding to various ATCs, as will be appreciated by those with ordinary skill in the art. The voice communications may also be received from other aircraft on any particular frequency.

Controller 102 monitors radio device 106, recognizes the voice communication, and generates an electronic transcript of the voice communications in operation 204 based at least in part on an expected or actual aircraft position and on local variations in phonetic alphabets. As used herein, the phrase "recognize a voice communication" means interpreting or translating the spoken word of the voice communication into an electronic format capable of being reproduced as a written word.

To base the recognition and generation on local variations, a current position of aircraft 100 or the programmed flight plan may be used to determine the location. For example, controller 102 may use the flight plan or GPS coordinates of aircraft 100 to recognize that the taxiway marked "D" at Atlanta is called "Dixie" rather than "Delta," as described above. In some alternative embodiments, local variations are not implemented during transcription. In some embodiments, controller 102 filters the voice communications to remove non-standard phrases. For example, phrases such as "good day" or "thank you" may be removed from the transcription to reduce clutter on display device 104.

Controller 102 identifies and replaces waypoints in the electronic transcript with standardized waypoint identifiers in operation 206. For example, controller 102 may replace spoken word waypoints, spelled out phonetic alphabet waypoints, and combinations thereof in the electronic transcript with standardized three to five letter waypoint identifiers. In some embodiments, controller 102 identifies based at least in part on airways, waypoints, navigation aids, and airports within radio communication range of a current location of aircraft 100 or locations on a flight plan of aircraft 100.

Controller 102 identifies call signs of originators and/or intended recipients of the voice communications in operation 208. For example, controller 102 may identify a call sign based on an abbreviated call sign, a variation on the call sign, an end portion of the call sign, or combinations thereof. For example, controller 102 may identify the intended recipient based on a call sign identified in operation 208. Similarly, controller 102 may identify the originator of the voice communications based on a call sign.

Controller 102 filters the electronic transcript in operation 210 based at least in part on the originator and/or the intended recipient of the voice communications. In the embodiment provided, controller 102 filters the electronic transcript to display only voice communications for which aircraft 100 is the intended recipient. In some embodiments, non-ATC originators may be filtered so that only ATC communications are presented to the flight crew.

Controller 102 determines whether to translate the electronic transcript in operation 212. For example, the flight crew may select or controller 102 may be programmed with a specified native language to be displayed to the flight crew. In some embodiments, controller 102 may refer to the flight plan or current GPS coordinates of aircraft 100 to determine the most likely language encountered in the voice communications. In some embodiments, controller 102 may include language recognition software in the speech recognition engine to detect the language of the voice communications. When the most likely language or the detected language is different from the specified native language, controller 102 will translate the electronic transcript into the specified native language in operation 214. When the most likely language is the same as the specified native language, controller 102 will not translate the electronic transcript and will proceed to operation 216.

Operation 216 displays the electronic transcript on a display device. For example, controller 102 may display the electronic transcript on display device 104, as described above. Method 200 may further include operations associated with any of the further configurations described above for controller 102 without departing from the scope of the present disclosure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft instrumentation system, comprising:
 a radio device;
 a display device for displaying information to a flight crew of an aircraft; and
 a controller communicatively coupled with the radio device and the display device, the controller configured to:
  monitor the radio device;
  recognize a voice communication received over the radio device;
  generate an electronic transcript of the voice communication;
  replace spoken word waypoints, spelled out phonetic alphabet waypoints, and combinations thereof in the electronic transcript with standardized waypoint identifiers; and
  control the display device to display a transcript of the voice communication.

2. The aircraft instrumentation system of claim 1, wherein the controller is further configured to generate the electronic transcript based at least in part on local variations in phonetic alphabets.

3. The aircraft instrumentation system of claim 1, wherein the controller is further configured to identify a call sign based on one of an abbreviated call sign, a variation on the call sign, an end portion of the call sign, and combinations thereof.

4. The aircraft instrumentation system of claim 1, wherein the controller is further configured to filter the voice communication to remove non-standard aviation phrases.

5. The aircraft instrumentation system of claim 1, wherein the controller is further configured to identify at least one of an airway, a waypoint, a navigation aid, and an airport within the voice communication.

6. The aircraft instrumentation system of claim 5, wherein the controller is further configured to identify the at least one of the airway, the waypoint, the navigation aid, and the airport within the voice communication based on at least one of a flight plan and a current location of the aircraft in which the aircraft instrumentation system is located.

7. The aircraft instrumentation system of claim 1, wherein the controller is further configured to identify an intended recipient of the voice communication.

8. The aircraft instrumentation system of claim 7, wherein the controller is further configured to filter the electronic transcript based on the intended recipient of the voice communication.

9. The aircraft instrumentation system of claim 7, wherein the controller is further configured to identify the intended recipient based on a call sign in the voice communication.

10. The aircraft instrumentation system of claim 1, wherein the controller is further configured to identify an originator of the voice communication.

11. The aircraft instrumentation system of claim 10, wherein the controller is further configured to filter the electronic transcript based on the originator of the voice communication.

12. The aircraft instrumentation system of claim 1, wherein the controller is further configured to translate the voice communication into a predetermined language.

13. An aircraft, comprising:
a radio device;
a display device; and
a controller communicatively coupled with the radio device and the display device, the controller configured to:
monitor the radio device;
recognize a voice communication received over the radio device;
generate an electronic transcript of the voice communication;
identify at least one of airways, waypoints, navigation aids, and airports within the voice communication; and
control the display device to display a transcript of the voice communication.

14. The aircraft of claim 13, wherein the controller is further configured to replace spoken word waypoints, spelled out phonetic alphabet waypoints, and combinations thereof in the electronic transcript with standardized waypoint identifiers.

15. The aircraft of claim 13, wherein the controller is further configured to identify a call sign based on one of an abbreviated call sign, a variation on the call sign, an end portion of the call sign, and combinations thereof.

16. The aircraft instrumentation system of claim 1, wherein the controller is further configured to filter the voice communication to remove non-standard aviation phrases.

* * * * *